March 30, 1971 B. RUDLOFF 3,573,131
PROCESS OF MANUFACTURING SOUND-PROOFING COMPOSITE PRODUCTS
Filed March 22, 1967
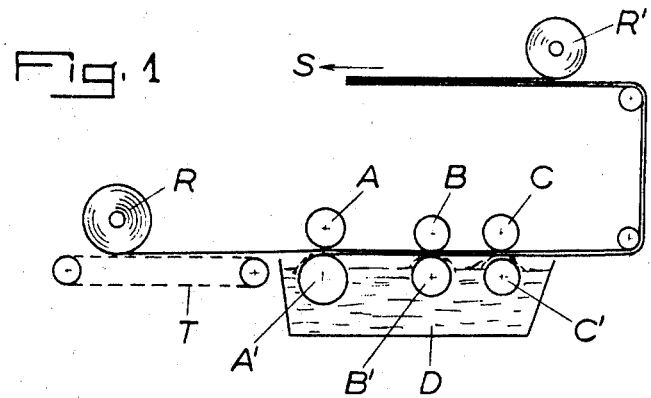
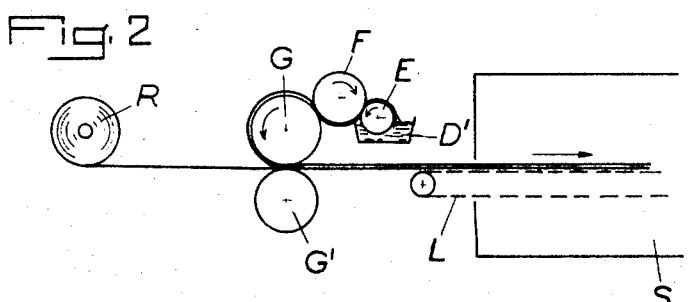
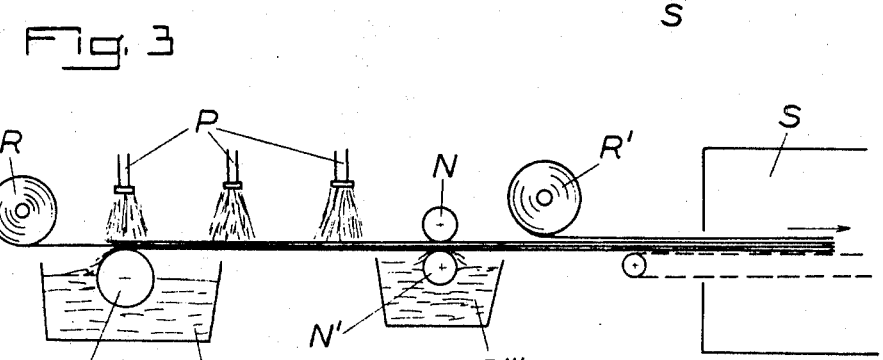
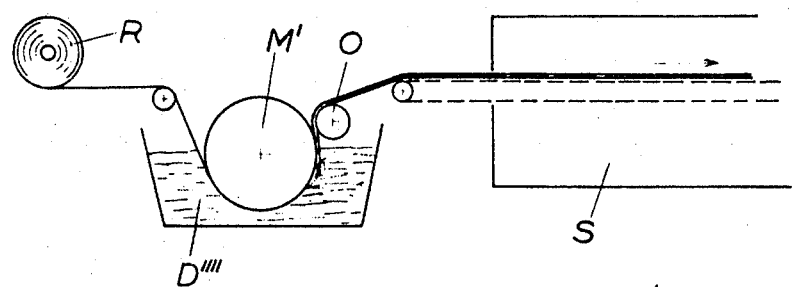

United States Patent Office 3,573,131
Patented Mar. 30, 1971

3,573,131
PROCESS OF MANUFACTURING SOUND-PROOFING COMPOSITE PRODUCTS
Bernard Rudloff, Marckolsheim (Bas-Rhin), France
Filed Mar. 22, 1967, Ser. No. 625,263
Claims priority, application France, May 23, 1966,
8,618
Int. Cl. C09j 5/00
U.S. Cl. 156—306                             6 Claims

ABSTRACT OF THE DISCLOSURE

A process of the continuous manufacture of moldable, thermo-weldable, self-adhesive sound-proofing composite products, comprising the utilization of a layer of felt or unwoven material agglomerated with fibers charged with two different powdered resins having different melting points, namely 60° C. and between 130° C. and 140° C. The material is subjected to a baking treatment at 60° C. for about 4 minutes to impart sufficient strength. A film or coating of 0.5 to 1 mm. of a bituminous or plastic material in the liquid or pasty state is applied to the material. The composite product, thus produced after drying at 60° C. is delivered in a roll or cut to size. The composite product may be composed of a plurality of layers of felt or unwoven material with the mentioned film, which layers are subjected to a baking treatment at 130°–140° C. for 20 to 30 minutes with a view to produce a sound-proof assembly having a molded, undeformable lining.

---

The present invention relates to a process for the manufacture of sound-proofing composite products.

The present invention concerns the problem of sound-proofing and the production of walls which are effective against noise resulting from the assembling, constituting a sound-proofing composite product or sandwich, comprising two kinds of materials, the first being of low density and having the purpose of absorbing aerially transmitted noises, the second kind being flexible and very heavy so as to form a barrier and also to damp noises transmitted by solid bodies, and more especially to prevent their vibration when they are stuck or welded onto metal sheets or resonant metallic objects. The assembling of the various layers of materials is effected by sticking or by means of fasteners, or by sewing if the flexibility of the materials permits the passage of the needles, and the operations are primarily carried out manually and require a large amount of labor.

These sound-proofing composite products or sandwiches are known in automobile construction, where they are applied by manual sticking to bodywork, floors, boots tunnel passages, gear boxes and rear platforms, and in certain cases to the wall separating the motor elements from the passenger compartment. They are also judiciously used in buildings, especially being placed in metallic or wooden partitions, doors, ceilings and floors. Sound-proofing is generally effected by means of numerous pre-cut pieces which are stuck by hand on the various parts.

With the aim of improving the production of sound-proofing composite products and facilitating their placing upon the parts to be sound-proofed, the present invention has for its object a process for the continuous manufacture of moldable, thermo-weldable, self-adhesive, sound-proofing composite products which comprises the use as absorbent material of a layer of felt or unwoven material, agglomerated with fibers of any kind or origin, which in its conventional continuous manufacture is charged with two different resins having different melting points, one at 60° C., and the other between 130 and 140° C., and subjecting it to a baking treatment at 60° C. in order to provide, as a result of the polymerization of the first resin, a sufficient mechanical strength, so that it can be subjected subsequently to a surface treatment by application of a film or coating, 0.5 to 1 mm. in thickness, of an appropriate material in the liquid or pasty state, for example, a bituminous product or a plastic material, which moreover may be charged with a material of high density, such as barium sulphate or asbestos, but which retains a very great flexibility in the cold state. The composite product, thus produced, after tunnel drying at 60° C., next is delivered in roll or cut to size. After application of the composite product in appropriate size to flat surfaces or shaped surfaces to be sound-proofed, these surfaces thus covered by the composite product, which moreover may be composed of a plurality of layers, the felt or unwoven material with the film, are subjected to baking at 130°–140° C. for 20 to 30 minutes to effect the polymerization of the second types of resins, with the purpose of producing an assembly with undeformable molded linings.

It is still another object of the present invention to provide new industrial products, namely the sound-proofing composite products or sandwiches produced by the utilization of the manufacture process above-identified.

These composite products constitute an acoustic barrier in the form of flexible, moldable, self-shapeable sandwiches and are self-adhesive on contact with heat, or in the cold state, upon all plane or shaped objects. They have adjustable flexibility, with a great facility of application to pieces partially in relief without prior cutting out, so as to follow exactly the profiles of the objects to be lined. These composite products are produced and positioned with great economy of labor, presenting a better appearance of the lined objects and parts and a better noise-sealing. Moreover after cutting to shape their positioning requires no retouching for leveling the surfaces.

With these and other objects in view which will become apparent in the following detailed description, the present invention will be clearly understood in connection with the accompanying drawing, in which:

FIG. 1 is a diagrammatic view of the operation effecting the continuous surfacing of the agglomerated felts or unwoven materials;

FIG. 2 shows another method of surfacing;

FIG. 3 shows the replacement of the upper surface by banks of spray-gun nozzles; and FIG. 4 illustrates a method of surfacing by immersion.

The felts or unwoven materials, constituting the noise-absorbing part, are charged in manufacture with a powdered resin having a melting point of 60° C., for example, esterified colophony, in a percentage of 10% of the weight per square meter of fibers plus resins, and another powdered resin having a melting point of 130°–140° C., phenol resin, PVC or polyethylene. The percentage will be respectively 20, 15 or 25% of the weight per square meter of films plus resins.

After heating for 4 minutes at 60° C., the felts are subjected to a surfacing treatment, consisting of coating with a film or coating of 0.5 to 1 mm. in thickness of bituminous or plastic products in the liquid or pasty state, which may be charged with materials of high density such as barium sulphate or asbestos.

As shown in FIG. 1 of the drawing, the agglomerated felt or unwoven material is unwound from a roll R onto a conveyor belt T and passes between rollers A and A′, the latter being partially immersed in a liquid product contained in tank D, which can receive all kinds of more or less viscous products, such as bitumens, latex, polyvinyl chloride, which may even be heated in the tank.

The rollers A and A′ are driven mechanically by any suitable means (not shown) and entrain the felt, which receives one liquid layer and can receive another between rollers B, B', and then between rollers C, C', according to the thickness to be produced. The felt thus covered is entrained towards a drying tunnel S, for heating to 60° C.

Before the entry to the tunnel, it is also possible to unwind a second roll of felt R' in order to produce a sandwich of three layers, namely a coating film between two felt layers.

After tunnel drying, the obtained surfaced unwoven materials or composite products are either wound on reels or cut into sheets by a guillotine.

FIG. 2 shows a method of surfacing from the top.

In tank D' which receives the coating products to be applied, a cylinder E is partially immersed. A conveyor cylinder F transmits to cylinder G the coating material, which is thus applied during the passage of the unwoven felt between cylinder G and G'. The cylinder G passes freely over the felt. The cylinders E and G, G' are driven mechanically and present the surfaced product to conveyor table L of the tunnel S.

This first surfacing can also be repeated at will.

In FIG. 3, the upper surfacing system is replaced by a bank of spray-gun nozzles P which atomize the pressurized surfacing material onto the unwoven felt, with or without a supply of air under pressure, while the lower part of the unwoven felt can be coated by means of cylinders M and N' immersed in the tanks D'' and D''', respectively, before the entry into the tunnel S.

However, the coating operation can also be effected by immersion (FIG. 4). The unwoven felt R is brought into the tank D'''' and immersed by the cylinder M'. A cylinder O presses the soaked material onto the cylinder M'. By the adjustment of this pressure and of the speed of passage over cylinder M', it is possible to adjust the weight per square meter of the surface coating on the unwoven material, which moreover is also coated on the lateral edges before entering the drying tunnel S.

In this case again, and after the immersion-coating, it is easily possible to unwind additional rolls of unwoven felt onto each face of the unwoven material before its entry into the tunnel, in order to obtain a multilayer composite product or sandwich.

Whichever method of surfacing is utilized, the products in sheet form are applied to surfaces to be sound-proofed, which can be plane or shaped, especially, for example, the metal sheets of automobiles. These surfaces, thus lined, are subjected to a baking at 130°–140° C. for 20 to 30 minutes, during which operation the resins which remained intact in the felts, that is, those with higher melting points, are polymerized. During the same time the fusible coatings or films weld to the surfaces to be sound-proofed, and the assembly of the felt or unwoven composite product and its coating forms a molded, undeformable lining, with very great noise-sealing characteristics.

By virtue of their flexibility, which moreover is able to be regulated by the flexibility of the coating, and also by the flexibility of the air-permeable fibrous materials, the sound-proofing composite products obtained by the utilization of the process according to the present invention will be greatly appreciated in automobile construction, as they can very easily conform to the shapes of the floors and stamped metal sheets of which the body shells are composed.

Since the surfacing films can be lined with a layer which renders the composite products capable of self-adhesion in the cold state, their application to industrial apparatus of all kinds, or to prefabricated pieces for building construction, will be particularly easy and economical.

According to the same surfacing process it is also possible to render the agglomerated felts or unwoven materials liquid-proof and to manufacture sealing materials according to this same process for industry and construction, as well as packaging materials, and especially, maritime packaging materials.

Regarding the application of a sound-proofing sandwich covered with a layer of a thermofusible material, for example, after placing the product on the floor of a bodywork shell prior its passage into a painting tunnel, a welding against the metal sheet under the action of heat during its tunnel passage can be achieved. At the exit, the sandwich cools and is definitively fixed against the metal sheets and ribs of the bodywork shell, without any manual or mechanical retouching or activity. It becomes possible to position the entire sound-proofing of the floor in one single piece, whereas heretofore with the prior art this sound-proofing, effected after passage through the painting tunnel, was required to be effected by the manual sticking of numerous pre-cut pieces. Thus all this costly and inexact fitting can be eliminated, and the floor is ready to receive the final finish.

While I have disclosed several embodiments of the present invention, it is to be understood that these embodiments are given by example only and not in a limiting sense.

I claim:

1. A process for the continuous manufacture of sound-proofing composite products, comprising the steps of
   producing sound-proof walls of a layer of felt or felt-like material being charged with two different powdered resins having different melting points,
   one of said powdered resins comprising an esterified colophony having a melting point at about 60° C.,
   the other of said powdered resins having a melting point of about between 130° C. and 140° C.,
   subjecting said powdered resins to a baking treatment at about 60° C. for about 4 minutes in order to impart to it a sufficient mechanical strength, by polymerization of said one of said resins, and adapted to attain sufficient mechanical strength,
   subjecting said resins to a coating of about 0.5 to 1.0 mm. thickness and of a material selected from the group consisting of bitumens, latex, polyvinyl chloride in an about liquid to pasty stage, and
   subjecting said layer of felt-like material to a baking step at about 130° C. to about 140° C. for about 20 to about 30 minutes, in order to bring about the polymerization of the other of the resins, in order to produce a sound-proofed assembly having a molded, undeformable lining.

2. The process, as set forth in claim 1, wherein
   said step of subjecting said resin to a coating comprises the step of passing said layer under pressure over a roller partially immersed in film material contained in a heatable tank.

3. The process, as set forth in claim 1, wherein
   said step of subjecting said resins to a coating comprises atomization of coating material on the upper face by a spray-gun bank, and
   coating of the lower face by immersion.

4. The process, as set forth in claim 1, wherein
   said step of subjecting said resins to a coating comprises immersing in a liquid to viscous material, and then drying.

5. A process for the continuous manufacture and application to objects of sound-proofing composite products, comprising the steps of
   producing sound-proof walls of a layer of felt or felt-like material being charged with two different powdered resins having different melting points,
   one of said powdered resins comprising an esterified colophony having a melting point at about 60° C.,
   the other of said powdered resins having a melting point of about between 130° C. and 140° C.,
   subjecting said powdered resins to a baking treatment at about 60° C. for about 4 minutes in order to impart to it a sufficient mechanical strength, by polymerization of said one of said resins, and adapted to attain sufficient mechanical strength, subjecting said resins to a coating of about 0.5 to 1.0 mm. thickness and of a material selected from the group consisting of bitumens, latex, polyvinyl chloride in an about liquid to pasty state, subjecting said layer of felt-like material to a baking step at about 130° C. to about 140° C. for about 20 to about 30 minutes, in order to bring about the polymerization of the other of the resins, in order to produce a sound-proofed assembly having a molded, undeformable lining, and applying said composite product to a part of the metal sheeting of an automobile.

6. The process, as set forth in claim 1, wherein said other of said resins comprises a material selected from the group consisting of phenolic resins, PVC and polyethylene.

References Cited

UNITED STATES PATENTS

| | | | |
|---|---|---|---|
| 2,543,101 | 2/1951 | Francis, Jr. | 156—62.2 |
| 2,959,495 | 11/1960 | Cubberley et al. | 117—140 |
| 2,961,029 | 11/1960 | Rainar | 156—242X |
| 2,989,414 | 6/1961 | Pecker | 117—140X |
| 3,429,728 | 2/1969 | Goldstone et al. | 117—140X |

FOREIGN PATENTS

| | | | |
|---|---|---|---|
| 760,751 | 11/1956 | Great Britain | 117—140 |
| 833,679 | 4/1960 | Great Britain | 117—140 |

REUBEN EPSTEIN, Primary Examiner

U.S. Cl. X.R.

156—242, 71, 276; 117—88, 140, 118